(No Model.)
J. L. GUINN.
COTTON CULTIVATOR.
No. 445,173. Patented Jan. 27, 1891.
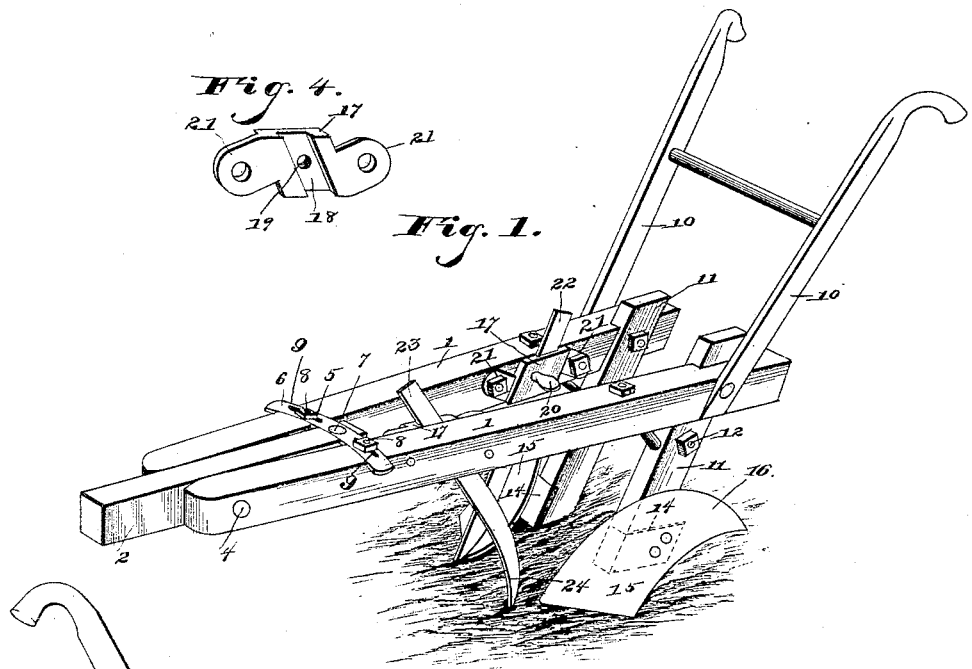
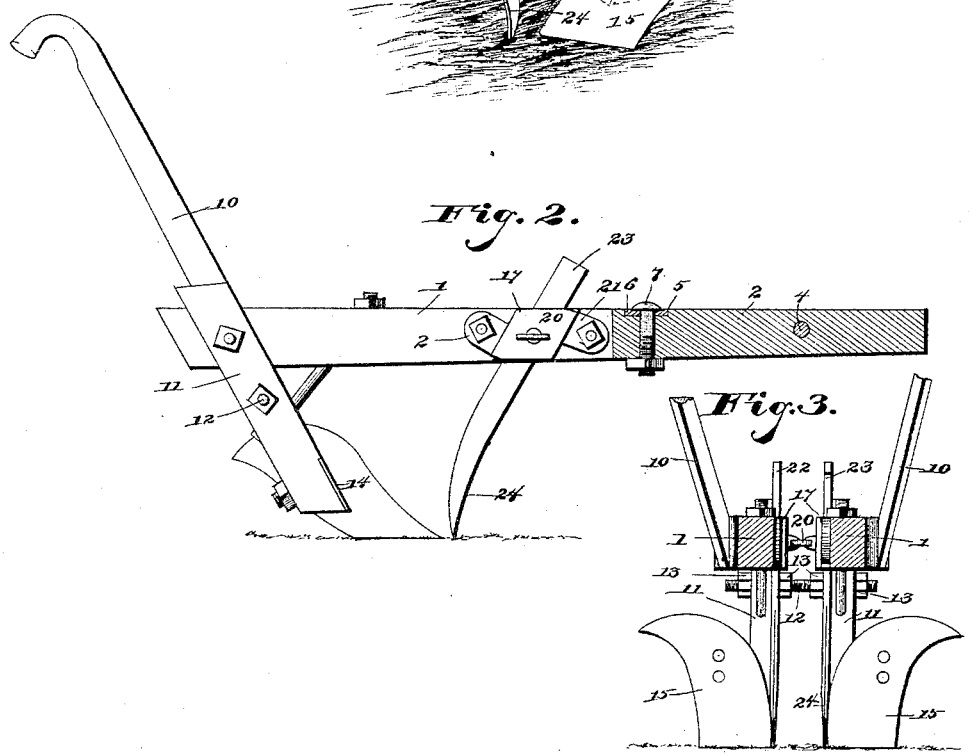
Witnesses:
Samuel Ker
W. T. Duvall
Inventor
Jessee L. Guinn.
By his Attorneys,
C. A. Snow & Co.

UNITED STATES PATENT OFFICE.

JESSEE LEE GUINN, OF NEALS, MISSISSIPPI.

COTTON-CULTIVATOR.

SPECIFICATION forming part of Letters Patent No. 445,173, dated January 27, 1891.

Application filed June 7, 1890. Serial No. 354,587. (No model.)

*To all whom it may concern:*

Be it known that I, JESSEE LEE GUINN, a citizen of the United States, residing at Neals, in the county of Chickasaw and State of Mississippi, have invented a new and useful Cotton-Cultivator, of which the following is a specification.

This invention has relation to that class of cultivators designed for cultivating between the rows of cotton-plants.

The objects of the invention are to provide a very simple, economically and strongly constructed cultivator for the above purpose, the same being so arranged as to permit of the operator following the cultivator to obtain a clear view of the cotton-plants which the cultivator is to pass over, thereby avoiding injury to the plants; furthermore, to provide means for preventing the plows from tearing the cotton as they pass each side of the same, and for removing and tearing up old stalks.

Other objects and advantages of the invention will hereinafter appear, and the novel features thereof will be particularly pointed out in the claim.

Referring to the drawings, Figure 1 is a perspective of a plow constructed in accordance with my invention. Fig. 2 is a longitudinal section. Fig. 3 is a transverse section. Fig. 4 is a perspective in detail of one of the brackets.

Like numerals of reference indicate like parts in all the figures of the drawings.

In practicing my invention I provide a pair of longitudinal beams 1, between which at their front ends is located a central draft-beam 2, and through the three beams is passed a binding-bolt 4. In rear of the bolt 4 the three beams are recessed, as at 5, in line with each other, said recess being formed upon a circle, and in the same is seated a curved plate 6, bolted to the central beam by a bolt 7, for which purpose a central perforation is provided in the plate, and to the opposite side beams by bolts 8, provided with taps, said bolts being passed through curved slots 9, formed in the plate near its opposite ends, whereby said side beams may be adjusted laterally, so as to spread or contract the space therebetween. The rear ends of the beams 1 have bolted thereto the usual handles 10, and have also depending therefrom and let into the beams a pair of plow-standards 11, said standards being secured to the side beams 1 by the same bolts that secure the handles. The standards 11 are connected by a right-and-left-hand-threaded tie-rod 12, provided at each side of each standard with a cap or nut 13, whereby the standards may be adjustably connected with relation to each other and in accordance with the front adjustment of the beams. Angular brackets 14 are bolted to each of the standards 11, and to these brackets near their outer ends are bolted the shovels 15, said shovels being outwardly disposed and provided with upwardly and rearwardly disposed shear portions 16.

17 designates a bracket provided with a central recessed portion 18 and with a threaded opening 19, in which is inserted a binding-screw 20. From diagonally-opposite corners of the bracket extend perforated securing plates or ears 21, through each one of which is passed a set-bolt 22. The brackets are right and left hand brackets and the recesses therefor are oppositely disposed. One of these brackets is secured to the inner face of each of the beams 1, and the inner or adjacent securing-ears are provided with a series of bolt-receiving openings, whereby they may be raised and lowered, during which movements the outer bolts act as the pivots.

22 designates the right-hand knife, and 23 the left-hand knife, each of which is mounted in its respective bracket, and by reason of the opposite dispositions of the recesses of the brackets similar opposite dispositions are given to the knives, which latter are snugly bound in position by means of the binding-screws mounted in the brackets and which bear upon the cutters or knives and serve to adjust them at any desired elevation. The left-hand knife 23 has its lower end curved, as at 24, the inner curved edge being the cutting-edge, while the opposite or right-hand knife 22 is perfectly straight.

From the construction described it will be apparent that the cultivator may be readily adjusted for different widths of row, and that the dirt will be taken from each side of the row and turned over from the cotton and not thrown upon the plant, all by reason of the disposition and peculiar formation of the shovels. By reason of the cutters, the points of which are set alike, the plows are prevented from tearing up the cotton, and also said cutters serve to pick up old stalks and throw them to one side, thereby avoiding any choking, as is common with the use of the ordinary double plow. Said cutters also serve as guides for steering or driving the plow in a straight direction.

Having thus described my invention, what I claim is—

In a plow of the class described, the combination, with the side beams and the plow-shovels secured thereto, of the brackets having a central inclined recess, that of one bracket being inclined in a direction opposite that of the other, and said brackets being located upon the inner face of each of the beams and further provided with opposite securing-plates, the outer ones of which have each a single perforation and the inner or adjacent ones of each of which have a pair or series of perforations, adjusting-bolts mounted in the perforations, a straight knife mounted in the recess of the right-hand bracket, and a curved knife mounted in the recess of the left-hand bracket, set-screws passing through the brackets and taking against the knives, which latter terminate at their lower ends in advance of the shovels, substantially as specified.

In testimony that I claim the foregoing as my own I have hereto affixed my signature in presence of two witnesses.

JESSEE LEE GUINN.

Witnesses:
   J. F. HODGES,
   Z. T. HARPER.